July 12, 1949.  L. A. TROFIMOV  2,476,266
VARIABLE SPEED POWER TRANSMISSION
Filed Sept. 11, 1947  3 Sheets-Sheet 1

INVENTOR.
Lev A. Trofimov
BY Harry R. Canfield
ATTORNEY

July 12, 1949.  L. A. TROFIMOV  2,476,266
VARIABLE SPEED POWER TRANSMISSION
Filed Sept. 11, 1947  3 Sheets-Sheet 2
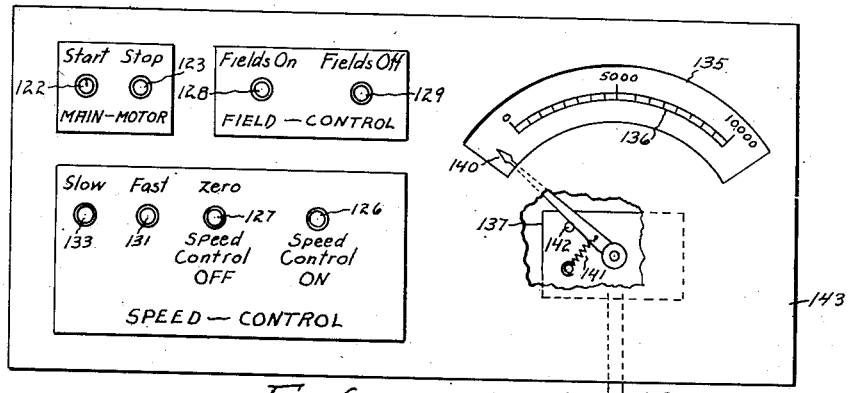
Fig. 6
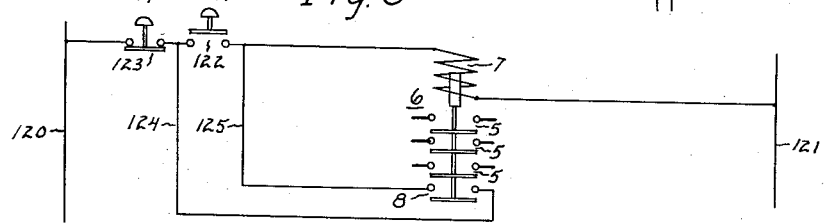
Fig. 2
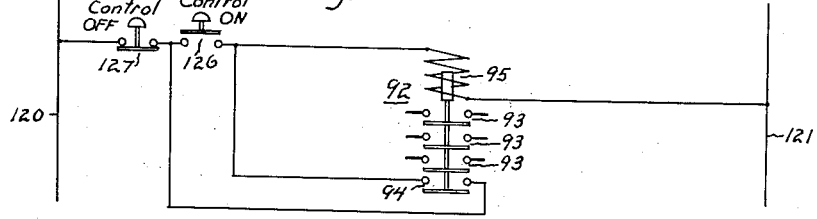
Fig. 3
Fig. 4
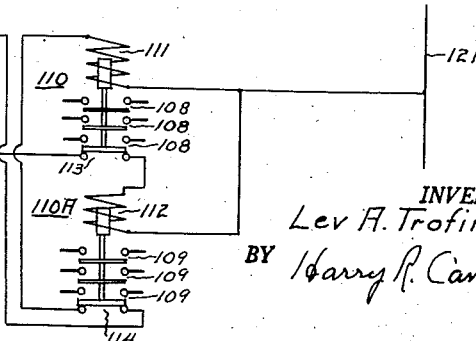
Fig. 5
INVENTOR.
Lev A. Trofimov
BY Harry R. Canfield
ATTORNEY July 12, 1949.  L. A. TROFIMOV  2,476,266
VARIABLE SPEED POWER TRANSMISSION
Filed Sept. 11, 1947  3 Sheets-Sheet 3

INVENTOR
Lev A. Trofimov
By Harry P. Canfield
ATTORNEY

Patented July 12, 1949

2,476,266

UNITED STATES PATENT OFFICE 2,476,266

VARIABLE-SPEED POWER TRANSMISSION

Lev A. Trofimov, Willoughby, Ohio

Application September 11, 1947, Serial No. 773,445

17 Claims. (Cl. 318—13)

This invention relates to transmissions for driving a power delivery shaft at adjustably variable speed from a continuously running power-supplying motor.

The invention comprises, generally, and among other things, a mechanical power transmission of the differential gearing class, between the power output shaft and a constant-speed power-supplying motor. And a control is provided for the power transmission by which the speed of the output shaft may be adjustably varied between zero speed and a maximum speed by manual actuation of the control; and by which the speed may be adjustably set by the control to any desired speed in said range from zero to maximum, by manual actuation of the control, and the control will thereafter automatically maintain the set speed constant within a very small, negligible range of variation, regardless of variations of load on the output shaft; and by which when the speed is set as referred to at a selected value, the control may be manually actuated to cause it to automatically bring the speed to zero, and then actuated to increase the speed, and the control will then automatically bring the speed up to the set value.

The entire control is arranged to be operated by manual push button contactors at a central station panel.

It is the primary object of the invention to provide a transmission and control therefor by which the above mentioned speed-control features (among others) of the output shaft, may be accomplished.

Another object is to provide improved means for indicating to an attendant at the control panel the speed of the output shaft at all times whereby he may actuate the control to cause it to effect the desired speed, or speed variations.

Other objects not specifically mentioned, will become apparent upon a reading of the following description which fully discloses the invention, taken in connection with the accompanying drawing, in which:

Fig. 1 is a diagrammatic view of an apparatus embodying the invention and a control therefor; and showing certain electromagnetic contactors controlling power circuits thereof and having auxiliary contacts; the circuit connections to the contactor windings and to the auxiliary contacts, being omitted to avoid complications in the drawing;

Figs. 2 to 5 inclusive are diagrammatic views, reproducing the electromagnetic contactors of Fig. 1, with the power circuits omitted, for simplification; and showing the circuit connections to the windings of the contactors and to their auxiliary contacts; and showing manual controls for the contactors;

Fig. 6 is a view illustrating a control panel for the manual controls of Figs. 2 to 5;

Figure 1:
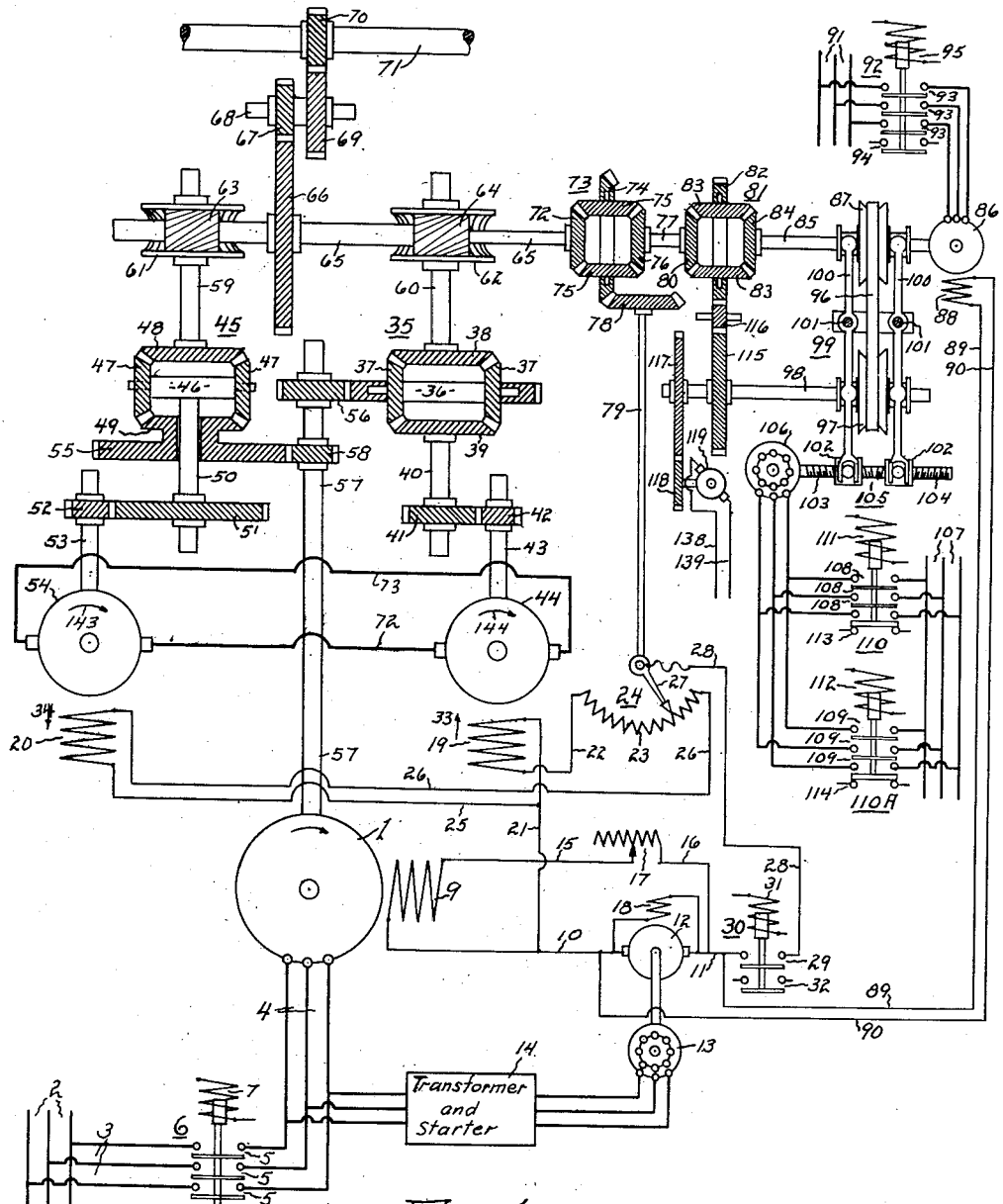

Referring to the drawing, Fig. 1, there is shown at 1 a power supplying motor; and it is preferred that it be a constant speed motor, and to this end, I have chosen to illustrate it as a synchronous electric motor, although any other type of engine or motor may be utilized instead. The motor 1 is energized from three phase supply mains 2 by conductors 3 and 4 through the corresponding main contacts 5 of an electromagnetic contactor 6 having a winding 7 and auxiliary contacts 8.

The motor 1 has a direct current field 9 energized from the direct current output mains 10 and 11 of an exciter 12 driven by an alternating current motor 13 connected to the conductors 4 through a transformer and starter 14 of conventional type, whereby the potential of the mains 2 may be different from that required by the motor 13, and whereby the exciter will be started up when the contactor 6 closes.

Field current from the exciter main 10 goes through the winding 9 and back by wires 15—16 to the main 11 through a field adjusting rheostat 17. The exciter 12 is self-excited by a field 18.

The exciter 12 also supplies direct current to a pair of fields 19—20 (to be referred to later); the current going from the main 10 by wire 21 through the field 19 and by wire 22 to one end of the resistor 23 of a potentiometer type of rheostat indicated generally at 24; and the current flowing from the wire 21 by wire 25 through the other field 20 and by wire 26 to the other end of the resistor 23; the currents flowing inwardly through portions of the resistor to an arm 27 movable over the resistor, and thence back to the main 11 by wire 28 through the main contacts 29 of an electromagnetic contactor 30, having a winding 31 and auxiliary contacts 32.

It will be noted that the field windings 19 and 20 as connected are energized oppositely as to their polarity; and this is indicated by the arrows 33—34.

At 35 is a differential gearing, comprising a spider 36, rotatably supporting pinions 37—37 with which mesh differential gears 38 and 39.

The differential gear 39 is connected by a shaft 40 to a gear 41, meshed with a pinion 42 connected by a shaft 43 to the rotor of a direct current generator 44.

At 45 is a differential gearing, comprising a spider 46 rotatably supporting pinions 47—47 with which mesh differential gears 48 and 49.

The spider 46 is connected by a shaft 50 to a gear 51 meshed with a pinion 52 connected by a shaft 53 to the rotor of a direct current generator 54.

The differential gear 49 has connected thereto, and rotatable bodily therewith, a gear 55.

The spider 36 is power driven by a gear 56 on the shaft 57 of the motor 1; and to this end, the spider 36 may for convenience be in the form of a ring gear having external peripheral teeth meshed with the gear 56.

The gear 55 and therefore the differential gear 49, are power driven at times by a gear 58 on the motor shaft 57 and meshed with the gear 55 and at other times the gear 55 drives the gear 58.

The differential gears 48 and 38 are connected, by shafts 59—60, to worm or helical gears 61—62, with which are meshed worms or helical gears 63—64, which are connected by a shaft 65. These worm and worm gear sets are alike.

Upon the shaft 65 is a large gear 66, meshed with a smaller gear 67 on a shaft 68 on which also is a larger gear 69, meshed with a smaller gear 70 on a power output load shaft 71 which latter may be connected to any apparatus load to be driven.

The generator 44 has its output terminals connected to the input terminals of the generator 54 by a closed loop circuit comprising wires 72 and 73.

Certain quantitative features of the apparatus as thus far described will now be given, predicated on a size of apparatus capable of delivering 350 horsepower from the output shaft 71, as an illustrative example.

The motor 1 may suitably be a 500 horsepower motor running at 1200 revolutions per minute. The generators 54 and 44 may suitably be generators rated at 185 kilowatts at 880 R. P. M.; and the exciter 12 may be of 5 kilowatts capacity. The output shaft 71 and the shafts 59 and 60 and differential gears 48 and 38, are here considered as at rest. The gear ratio of the gear 56 and spider 36 is one-to-three and the spider is therefore driven at 400 R. P. M.; the differential gear 39 and shaft 40 will therefore be driven at 800 R. P. M. The gear ratio of the gears 41 and 42 is two-to-one so that the shaft 43 and generator rotor 44 are driven at 1600 R. P. M.

The gear ratio of the gears 58 and 55 is one-to-six, so that, with the output shaft 71 at rest as here considered, the gear 55 and differential gear 49 are driven at 200 R. P. M.; and the spider 46 and shaft 50 are accordingly driven at 100 R. P. M.

The gear ratio of the gears 51 and 53 is four-to-one so that the shaft 53 and rotor of the motor 54 are driven at 400 R. P. M.

The rotors 44 and 54 are driven in the same direction, for example as indicated by the arrows 144 and 143 and as stated at rotary speeds respectively of 1600 and 400.

In the operation of the apparatus thus far described, the motor 1 and the exciter 12 are started up by closure of the contactor 6, but it is preferable to do so with the contactor 30 open, to keep the generator fields 20 and 19 unenergized; the synchronous motor field 9 however receiving energization from the exciter.

After the motor 1 is up to speed, and the generators 54 and 44 are being driven at 400 and 1600 R. P. M. respectively, the contactor 30 is closed and the fields 20 and 19 become energized.

There will be degrees of energization for the respective fields 20 and 19 at which the voltage of the generator 54 will be equal to and opposite to that of the generator 44, and, at which no current will flow in the loop 72—73; and it will be assumed that the arm 27 of the potentiometer is at this time in the position to provide these relative field strengths, which may be referred to as normal strengths (although the fields 20 and 19 may not be actually equalized).

The generators 54 and 44 therefore will run idly and the whole apparatus will be in an idle condition with the output load shaft 71 at rest.

If now (as by means to be described) the potentiometer arm 27 be moved to strengthen the field 19 and weaken the field 20, the potential of the generator 44 will overpower that of the generator 54 and generate current load in the loop circuit 72—73 and supply electric power to the generator 54, and this and the weakened field of the generator 54 will cause it to act as an electrically driven motor.

The load on the generator 44 will cause it to slow down, and the motor-action of the motor 54 will cause it to speed up.

It may be stated as an incidental fact that the interconnected gearing between the generator 44 and motor 54 will cause the sum of their speeds to always be equal, in this instance, 2000 R. P. M.

Slowing down of the generator 44, and with it the differential gear 39, will cause the differential gear 38 to rotate; and speeding up of the motor 54 and with it the spider 46 will cause the differential gear 48 to rotate inasmuch as the spider 36 and gear 49—55 cannot change speed, being geared to the constant speed shaft 57. The rotation of differential gears 38 and 48 will be in the same direction; and they will rotate the worm and worm gear sets 62—64 and 61—63 in the same direction; and the angular or helical direction of the intermeshed teeth of the two worm and worm gear sets being alike, as referred to, they will drive the shaft 65, which, acting through the gears 66 to 70 will drive the output shaft 71.

The adjustment range of the potentiometer 24, and the output of the exciter 12, are provided to be capable of a range of energization of the fields 19 and 20, to cause the generator 44 to be slowed down to 400 R. P. M. and the motor 54 to speed up, acting as a motor, to 1600 R. P. M.; and corresponding to these speeds, the gear ratio of the gear sets 61—63 and 62—64, and of the gears 66 to 70 are provided to give to the output shaft the speed of 10,000 R. P. M.

Thus by changing the adjustment at the potentiometer 24 (as will be described) the output shaft 71 may be held at rest, or zero speed; or may be driven at 10,000 R. P. M., or at any intermediate speed, and by very small speed steps, determined by the size of the "steps" of the potentiometer 24.

As to the power thus transmitted to the output shaft 71, as its various speeds, it may be said in general, that the generator 44 is in the nature of a reaction point on which the motor 1 or its shaft 57, reacts, to transmit power through the differential gearing 35, partly directly to the output shaft and partly to the generator 44; and that the power absorbed by the generator 44 is transformed into electric power at the generator and again transformed into mechanical power at the motor 54 and is transmitted through the differential gearing 45, partly directly to the output shaft and partly back to the main motor shaft 57. Thus no power is lost except that due to friction and incidental losses in the generator 44 and motor 54.

In more detail, the flow of power while driving the output shaft is as follows. Starting with the power supplying motor 1, power is supplied by the motor to the shaft 57 and goes thence through gear 55 to the spider 36 and thence to the pinions 37—37 and there divides, part flowing to the differential gear 38 and thence to the output shaft 71, and part flowing to the differential gear 39 and thence to the generator 44 to drive it.

From the generator 44, power flows to the motor 54 and thence to the spider 46 and pinions 47—47 where it divides, part flowing to the differential gear 48 and thence to the output shaft 71 and part flowing to the differential gear 49 and thence to the motor shaft 57.

Thus the full power of the motor 1 can be delivered to a load on the output shaft at all speeds.

Reference has been made to moving the potentiometer arm 27 to vary the speed of the output shaft. Means will now be described for moving it, under control of an attendant, to automatically adjust the energization of the fields 19 and 20 to cause the output shaft 71 to rotate at any desired speed in its range, and to maintain that speed at variations of driven load.

The shaft 65 is extended beyond the worm 64 and connected to the differential gear 72 of a differential gearing 73, having a spider 74 rotatably supporting pinions 75—75 meshed with the differential gear 72 and with a differential gear 76. A speed reference shaft 77 is connected to the differential gear 76.

The spider 74 has bevel teeth on its periphery meshed with a bevel gear 78 connected to a shaft 79 on which the potentiometer arm 27 is mounted.

The speed reference shaft 77 is driven at different selected speeds (as will be described) and it will be apparent that if its speed is the same as that of the shaft 65, and in the opposite direction, the spider 74 will remain at rest and hold the potentiometer arm 27 at rest; and if the shaft 77 is rotated faster or slower than the shaft 65, the spider will be rotated and rotate the shaft 79 and move the potentiometer arm 27.

The shaft 77 is connected to a differential gear 80 of a differential gearing 81, comprising a spider 82 rotatably supporting pinions 83—83 meshed with the differential gear 80 and a differential gear 84.

The differential gear 84 is connected to a shaft 85 connected to the rotor of a synchronous motor 86, and to an intermediate variable diameter pulley 87.

The synchronous motor 86 has a direct current field 88 energized by wires 89—90 connected across the exciter 12; and has its stator energized from three phase mains 91 through a magnetic contactor 92 having main contacts 93 and auxiliary contacts 94 and a winding 95.

The pulley 87 is connected by a belt 96 to a like variable diameter pulley wheel 97, on a shaft 98. The pulleys 87 and 97, illustrated as connected by a belt 96, may be and in some cases preferably are, chains and pulleys of the positive drive non-slipping commercial type.

The pulleys and belt are part of a variable speed transmission 99, of a well known type that will be recognized from the simplified showing; and comprises side levers 100—100 pivoted at 101—101, and engaged at one end with nuts 102—102, threaded on left hand and right hand threads 103—104 of a rotary screw 105; and upon rotation of the screw, in one direction or the other, the diameter of one pulley 87 or 97 will be increased and that of the other decreased, in a well known manner.

To rotate the screw 105, it is connected to an induction motor 106, energized from three phase mains 107 through the main contacts 108—109 of magnetic reversing contactors 110—110A having respectively windings 111—112 and auxiliary contacts 113—114.

The shaft 98 is connected to a gear 115 meshed with an idler gear 116 which in turn is meshed with teeth on the spider 82, and the gear 115 and the spider 82 (as a gear) are of equal diameter. In some cases, it may be preferable for the gear 115 and the spider 82 to be in the form of chain sprockets connected by a chain running thereon.

When the pulleys 87 and 97 are adjusted to equal diameters, or to a 1-to-1 ratio, the differential gear 84 and the spider 82 will rotate at the same speed and in the same direction, as will be apparent; and the differential gear 80 and speed reference shaft 77 will also rotate at that same common speed.

The synchronous motor 86 has a fixed constant speed, and at the said 1-to-1 ratio of the transmission 99, the speed reference shaft 77 will rotate at the speed of the motor 86.

If the ratio of the transmission 99 be changed to a 1-to-2 ratio, the spider 82 will be rotated at one half the speed of the differential gear 84, and the speed reference shaft 77 will stop rotating. Thus the speed of the speed reference shaft 77 may be adjustably changed from zero speed to the speed of the synchronous motor 86, or any speed in between, by corresponding rotary adjusted positions of the screw 105; and also at any adjusted set speed of the shaft 77, by the screw 105, the shaft 77 may be brought to rest by opening the contactor 92 to stop the synchronous motor 86, without disturbing the adjustment of the screw 105; and upon again closing the contactor 92 and bringing the motor 86 up to speed, the shaft 77 will return to its set speed.

As aforesaid, the shafts 77 and 65 rotate in opposite directions. When therefore the shaft 77 is brought to rest, as aforesaid, and the shaft 65 is turning, the latter will, as described, rotate the shaft 79 and move the potentiometer arm 27 in the said "normalizing" direction, and this will go on until the fields 20 and 19 are "normalized," and the output shaft 71 comes to rest, and the shaft 65 stops turning.

For any speed of the shaft 77, if its speed is greater than that of the shaft 65, the shaft 79 will be rotated in the other direction and operate the potentiometer to strengthen field 19 and weaken field 20 and speed up the output shaft 71 and shaft 65, until the speed of shaft 65, becomes equal to that of shaft 77, and the output shaft will run at a corresponding speed.

Any slowing down of output shaft 71 by an increase of driven load, will slow down shaft 65 to a speed less than that of shaft 77, and as will now be clear, teh potentiometer 24 will be operated to speed up the shaft 71 again until the shafts 65 and 77 are again of equal speed. The opposite result occurs if the load shaft 71 and shaft 65 speed up due to a decrease of driven load, as will be understood.

Thus in general, the shaft 77 may be driven at selected constant speeds or brought to rest; and if the two speeds of the shaft 65 and shaft 77 are different, the potentiometer 24 will be operated to speed up or slow down the shaft 65 until they are again equal; and concurrently speed up or slow down the output shaft 71 until said equality is reached.

In general overall operation, the output shaft 71 may be speeded up or slowed down, by turning the screw 105 in one direction or the other by the reversible motor 106; and brought to a fixed selected speed by momentary rotation of the screw 105. And the maximum speed of the shaft 71 will be attained when the screw 105 has adjusted the transmission 99 to a 1-to-1 ratio.

And the shaft 71 may optionally be brought to rest by stopping the motor 86; or by adjusting the transmission 99 to a 1-to-2 ratio.

The above described control of the speed of the output shaft, embodies the braking principle known as dynamic braking, to quickly stop the output shaft when desired, even if the load driven thereby is a high inertia load which opposes stopping.

Assume the maximum inertia conditions, that is, when the driven load is a high inertia load and the output shaft 71 is rotating at its maximum speed of say 10,000 R. P. M.; and that it is desired to stop the output shaft as quickly as possible; the generator 44 will be running at 400 R. P. M. with full strength of its field 19; and the unit 54 will be operating as a motor at 1600 R. P. M. with a minimum strength field; and the potentiometer arm 27 will be in a corresponding extreme position to give these relative field strengths.

If now the motor 86 be cut off and stopped, the shaft 77 will stop, and the potentiometer arm 27 will, as described above, move over toward its other extreme position; which will give the field 19 a weak energization and the field 20 a strong energization.

The motor 54 will then act as a generator at its high speed, and generate high voltage and consequently high current in the loop circuit 72—73. The heavy electrical load on the motor (generator) 54 will rapidly slow it down, and the generator 44 will speed up; and while the stopping of the shaft 77 would in any case as heretofore described ultimately bring the output shaft 71 to rest, the heavy load as just described on the motor (generator) will bring it quickly to rest, by dynamic braking action.

If, to stop or slow down the output shaft 71, the shaft 77 were not abruptly stopped by cutting off the motor 86, but were slowed down by rotation of the screw 105 as described, the said dynamic braking action would similarly go into effect but to a lesser degree to aid in slowing down the output shaft 71.

The speed of the output shaft may be indicated to an attendant to guide him in operating the motor 106 to turn the screw 105 to effect a desired speed of the output shaft 71, by any kind of well known tachometer, but I prefer to provide an improved electrically actuated tachometer for this purpose as follows.

Ordinarily, as in prior practice, an electric tachometer instrument is energized by an electric generator driven at the speed of the rotary element whose speed is to be indicated or at a speed proportional thereto.

However, in such tachometers, the speed indicating dial finger (or the like) gives very inaccurate speed indications at the lower speeds, because the tachometer instrument energizing current approaches zero as the indication approaches zero, so that at near zero speeds the energizing current is too small to effect an accurate or reliable indication.

According to my improvement, the tachometer generator is driven by a rotary element of the above described apparatus which not only rotates at speeds commensurably with the speed of the output shaft, (whose speed is being indicated) when the output shaft is rotating, but which continues to rotate after the output shaft comes to rest. There is thus always ample generator current to actuate the tachometer instrument even at zero speeds of the output shaft.

In Fig. 1, the shaft 98 rotates at the speed of the synchronous motor 86, and at the speed of the speed reference shaft 77, when the ratio of the transmission 99 is 1-to-1. These are the conditions for maximum speed of the output shaft 71; and under these conditions, a gear 117 on the shaft 98 drives a pinion 118 connected to the tachometer generator 119 and drives it at maximum speed, and develops maximum generator voltage.

When the transmission 99 is changed to its other extreme, to a 1-to-2 ratio, the shaft 98 rotates at one half of its said maximum speed and drives the generator 119 at half speed and it generates approximately one-half maximum voltage; and this is the condition when the shaft 77 and the output shaft are at rest.

It will be observed that there are other rotary elements in the system which rotate when the load shaft 71 is at rest, and change in speed commensurably with speed of the load shaft, and which always rotate in one direction, and therefore could be used to drive the tachometer generator 119; among which are the shafts 43 and 53, for example. A tachometer driven by one of these elements would indicate the speed of the load shaft as it changes. The particular tachometer drive above described (as will be more fully explained with reference to Fig. 6) responds immediately to a change of setting of the speed ratio of the device 99; and therefore indicates in advance the speed to which the load shaft 71 will arrive when its speed-to-be is adjusted at the device 99; and therefore the operator can, by observing the tachometer, pre-set the speed of the load shaft.

The control for the contactor 6 controlling the main motor 1 of Fig. 1 to start and stop it are shown in Fig. 2 in a conventional type of diagram.

The contactor 6 is reproduced, as in Fig. 1. The main circuits 3—3 and 4—4 of Fig. 1 are broken off at the contacts 5—5. The winding 7 is connected in a circuit across supply mains 120—121 through "start" and "stop" push button contactors 122 and 123, the contactor 122 being bridged by a maintaining circuit 124—125 through the auxiliary contacts 8 reproduced from Fig. 1 and which close when the contactor 6 is operated.

A control for the contactor 92 controlling the synchronous motor 86 of Fig. 1 to start and stop it, is shown in Fig. 3 and is like that of Fig. 2, and need not be described, the contactor 92 being reproduced and being under the control of push button contactors 126—127 designated as "Speed control on" and "Speed control off."

A control for the contactor 30 of Fig. 1 to control the field 19 and 20 is shown in Fig. 4 and again is like that of Fig. 2 and need not be described, the contactor 30 being reproduced and being under the control of push button contactors 128—129 designated as "fields on" and "fields off."

A control for the contactors 110—110A of Fig. 1 to start, stop, and reverse the motor 106 and screw 105 is shown in Fig. 5. The contacts 108—109 are reproduced with the main motor circuits thereto broken off.

The winding 111 of contactor 110 is connected across supply mains 120—121 through the normally closed interlock contacts 114 of contactor 110A, and through a normally open push button contactor 131.

The winding 112 of the contactor 110A is connected across the mains through the normally closed interlock contacts 113 of contactor 110 and through a normally open push button contactor 133.

The push button contactors 131 and 133 are designated as "fast" and "slow" respectively and are mechanically interlocked by a pivoted lever 134.

In Fig. 3 when the push button contactor 126 is momentarily closed, the contactor 92 closes and stays closed and the control of the output shaft speed is under control of the push buttons 131 and 133 of Fig. 5.

Thereafter, when the push button contactor 131 is momentarily closed, the contactor 110 momentarily closes and the motor 106 rotates momentarily and gradually changes the ratio of the transmission 99 to gradually increase the output shaft speed; and when the desired speed is attained, the contactor 131 is opened and the contactor 110 opens and the output shaft runs at that speed.

Similarly, when the push button contactor 133 is closed, the contactor 110A operates and the motor 106 runs in the reverse direction to decrease the output shaft speed to a desired slower speed.

In Fig. 3, with the output shaft running at any set speed as aforesaid, if the push button contactor 127 is opened, the motor 80 of Fig. 1 will stop and the output shaft will come to rest, and if thereafter the push button contactor 126 is momentarily closed, the contactor 92 will operate and stay operated, the motor 86 will again start and come up to speed and the output shaft will resume its set speed.

The push button contactors of Figs. 2 to 5, are all mounted on a central station panel 143 as shown in Fig. 6, with the push buttons designated as in Figs. 2 to 5.

On this panel 143 is mounted also a speed indicating instrument, illustrated diagrammatically.

The panel 143 has an arcuate opening 135 therein through which is visible a speed scale dial 136 with speed indications from zero to 10,000 R. P. M.

Behind the panel is an electrically actuated instrument 137 energized by wires 138—139, and of a type having a dial finger 140, which is rotated over the scale to positions commensurate with the degree of energization. The wires 138—139, reproduced from Fig. 1, come from the tachometer generator 119. The dial finger is conventionally spring returned by a spring 141 and held against a stop 142 when the instrument is de-energized. When fully energized at the maximum output of the tachometer generator 119 and maximum output speed of the shaft 71, as described, the dial finger 140 will move over and indicate 10,000 R. P. M. When the output shaft is at zero speed, the tachometer generator will be at half speed and deliver 50% as much current as at full speed and the dial finger will indicate zero speed on the scale; all for the advantages referred to hereinbefore.

When the operator wants the load shaft to rotate at any desired speed, he operates the device 99 as described to change its speed ratio, and as the speed ratio changes, the tachometer dial finger 140 moves over the scale 136; and he adjusts the speed ratio until the dial finger indicates the desired speed; and the load shaft comes up to the desired speed as described.

Figure 7:
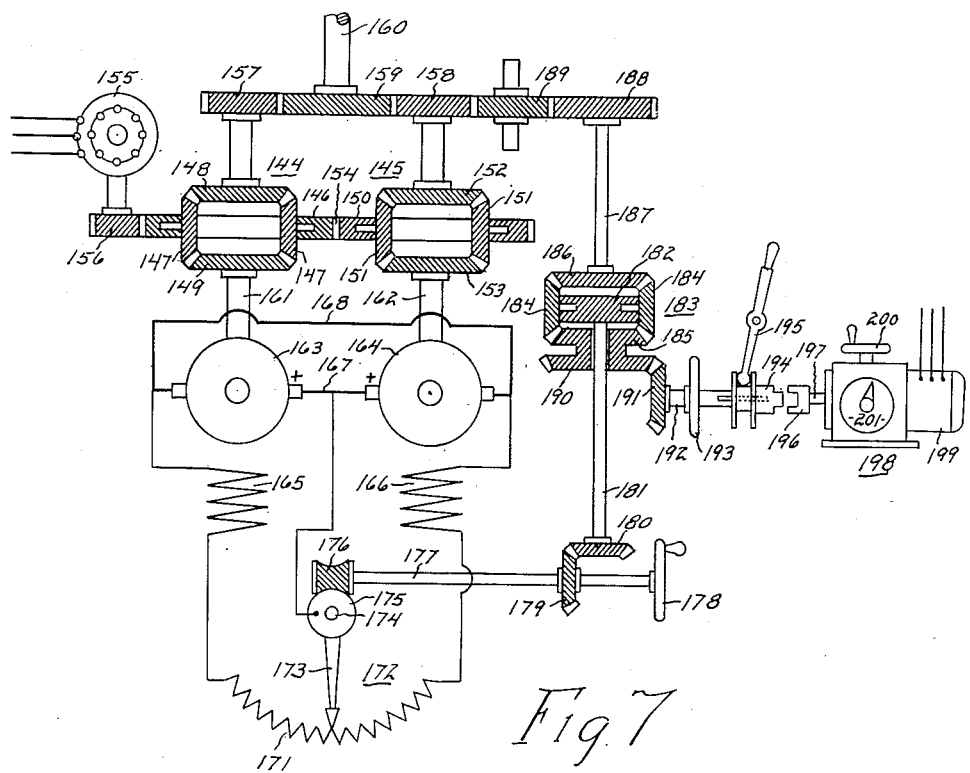
Fig. 7 is a diagrammatic view illustrating an embodiment of the invention in another form.

In some instances of use of the invention, it may be desirable to drive the load shaft at variable speeds in either the forward or reverse direction or bring it to rest. In such cases, the two main differential gearings are preferably made alike and symmetrical as to their connection with the output shaft and with the power supplying motor, and with the generator and motor connected thereto. Such an arrangement is illustrated in Fig. 7.

Shown generally at 144—145 are two differential gearings, the gearing 144 comprising a spider element 146 rotatably supporting a pinion or pinions 147, meshing with differential gearings 148 and 149; and the differential gearing 145 comprising similarly a spider element 150 rotatably supporting a pinion or pinions 151 meshing with differential gears 152 and 153.

In this embodiment of my invention, it is contemplated that the spider elements 146 and 150 are to rotate in opposite directions at equal speeds and to this end are of equal diameter and are provided with gear teeth on their outer peripheries meshed with each other as shown at 154; and in this embodiment of the invention, it is also contemplated that the motor power input is to be at the spiders 146—150; and accordingly, a power supplying, continuously running motor 155 drives a gear 156 meshed with one of the spider elements, for example the spider element 146. The motor 155 may in this case be a squirrel cage induction motor.

Connected to the differential gears 148 and 149 respectively are gears or pinions 157 and 158, meshed with a gear 159, to which is connected the rotary power output element or shaft, here 160.

The differential gears 148—153 are connected to shafts 161—162, which are connected respectively to the rotors of electrodynamic units 163—164, these units in the operation of the transmission may at one time be a motor and a generator respectively, and at another time a generator and a motor respectively and preferably are of the direct current type having respectively field windings 165—166.

Since the spiders 146—150 are driven in opposite directions, the torques developed in the shafts 161 and 162 will be in opposite directions, and this causes torques to be developed in opposite directions in the differential gears 148 and 152, and the gears or pinions 157 and 158. The differential gears 148 and 149 tend to rotate in the same direction as their associated spider 146, and the differential gears 152 and 153 tend to rotate in the same direction as their associated spider 150.

In general, with this arrangement, as will be apparent, if little or no torque is required to drive the units 163—164 by their shafts 161—162, they will be driven at equal speeds and at twice the speed of their associated spiders 146—150; and the differential gears 148—152 will tend to rotate in opposite directions but will remain at rest, and the output shaft 160 will remain at rest; but if one of the units, say the unit 164 is caused to develop substantial electrical load as a generator, the differential gear 153 will slow down, and the differential gear 152 will rotate, and more torque will be developed in the differential gear 152 and pinion 158 than in the differential gear 148 and pinion 157, and the pinion 158 will turn the gear 159 and the output shaft 160; and the gear 159 will rotate the gear or pinion 157 and the differential gear 148, which will cause the differential gear 149 to speed up, and speed up the unit 163. As a matter of fact, in a gearing of this arrangement, the arithmetical sum of the speeds of the shafts 161—162 will always be a constant. A like action occurs if the unit 163 is caused to develop load as a generator but in that case the output shaft 160 is driven in the other direction.

The units 163 and 164 are always driven in opposite directions, and the shunt windings 165—166 have suitable polarity, so that the positive potentials at the brush terminals of the units are as indicated in the drawing, and these brushes are connected together by a wire 167. The other brushes are connected by a wire 168. A main circuit is thus provided by the wires 167—168. The shunt field windings 165—166 are connected respectively at one end to the wire 168 and at their other ends are connected respectively by wires 169—170 to the ends of the resistor 171 of a potentiometer rheostat 172, having a rotary contact arm 173 movable over the resistor and connected to the wire 167.

When the units 163—164 are running at equal speeds and as generators and have equally energized fields 165—166, their polarities oppose and are equal, and no current flows in the main load circuit 167—168. Each generator as shown however, energizes its own shunt field winding through a local circuit across its terminals. The load of this shunt field current develops torque in the shafts 161—162 and applies torque to the gears 157 and 158, these torques being equal, and this torque is made sufficient (by suitable field windings) to load all of the intermeshing gear teeth of the system and eliminate lost motion or backlash therein so that subsequently, as will be described, when one of the torques predominates over the other to start the output shaft 160, from rest, the latter begins to rotate instantly in either the forward or the reverse direction as the case may be without gear tooth backlash or lost motion in the gear teeth that supply the driving torque.

The potentiometer arm 173 obviously will have an intermediate position on the resistor 171 at which the fields 165—166 are equally energized, and at which the potentials of the units 163—164 acting as generators are equal and opposed. Movement of the arm 173 from the intermediate position, say toward the left as viewed in the drawing, will strengthen energization of the field winding 166 and weaken that of the field winding 165.

The potential of the unit 164 acting as a generator will thereby be increased over that of the unit 163. Current will then flow in the said load circuit 167—168.

The load current from the generator 164 will now flow through the unit 163, in the direction to operate it as a motor, and because of its weakened shunt field it will tend to run at a high speed. At the same time the increased load on the generator 164 will cause it itself to slow down.

Even if the rotor of the unit 163 were not driven electrically as a motor, it would tend to be driven at increased speed when the rotor of the generator 164 slowed down, because of the said fact that the arithmetical sum of the speeds of the two is always a constant, but, operating electrically as a motor, it tends to run faster than that speed, and therefore its motor power is given to the shaft 161 and put back into the system, and applied to the output shaft 160 by the gear 157.

Obviously either of the units 163 or 164 may be caused to operate as a generator, and the other as a motor, by the corresponding movement of the rheostat arm 173 in one direction or the other from its intermediate position, so that as the net result, when the arm 173 is in a certain intermediate position, the output shaft 160 is held at rest by opposed torques; and when moved in one direction, the output shaft will rotate in one direction, and when moved in the other direction the output shaft will run in the other direction. If the arm 173 be moved to slow down the generator 164, the direction of rotation of the shaft 160 will be determined by the gear 158; and will be determined by the gear 157 if the generator 163 is the one that is slowed down.

The speed at which the output shaft runs is determined by the extent of movement of the rheostat arm 173 from its intermediate position; and if, with the output shaft 160 running, the rheostat arm 173 be returned to its intermediate position, causing the torques applied to the output shaft by the gears 157 and 158 to again become equal and opposite, the output shaft 160 will come to rest. With these two opposing torques on the shaft 160 when at rest, then when one predominates to again turn the shaft 160, all lost motion is already taken up by that torque which increases and predominates, and this is true no matter in which direction, forward or reverse, the shaft turns.

In view of the foregoing, it will be apparent that if the output shaft is connected to an ordinary inertia load and the load is at rest, the two torques applied to it will be equal and opposite, and lost motion is all taken up in both gearings; and that when one generator (say 164) is loaded more than the other, the torque of the gear 158 simply increases in magnitude without change of direction to turn the gear 159 and accelerate the load (without introducing gear tooth backlash) and the gear 157 tends to be driven in the direction opposite to that in which its torque is exerted and therefore tends to drive the unit 163 by the gears at a certain increased speed; but the generated load, driving the unit 163 as a motor, drives it above the speed at which it tends to be driven by the gears, and the motor action therefore reverses the direction of the gear 157 (which may introduce momentary backlash lost motion in one set of gearing) and thereupon the gear 157 begins to apply torque to the gear 159 and to the load to help drive the load in the same direction as the gear 158 is driving it. But it will be observed that smooth starting and acceleration of the load without back-lash is not interfered with by the said momentary backlash of the gear 157, because the load is started from rest and driven by the primary torque of the gear 158 which is developed without backlash.

With driven inertia loads the foregoing is true regardless of the direction in which the load is driven. It follows therefore that there is never cessation or interruption of torque on the load shaft 160, in going from rest (zero speed) to speeds in either forward or reverse direction, or in going through zero speed from either direction, or in returning to zero speed.

Again, if the driven load is of an overhauling type of load, (as when the shaft 16 drives a hoist cable drum) then, when it is at rest, one genera- tor (say the generator 164) will be loaded more than the other; the gear 156 will be applying torque in the direction to hold the load; the other unit (163) will be receiving current from the generator 164 and will be acting as a motor, and exerting torque at the gear 157, which torque also will be in the direction to hold the load. To start and accelerate the overhauling load (or to allow it to overhaul), the generated load of the generator 164 will be still further increased (or will be decreased) and the torques of the gears 158—157 will accordingly both increase in magnitude (or both decrease) without change of direction and therefore without any introduction or back-lash, or any cessation of torques, as the speed of the load changes from, or to, or through zero speed.

The above described operation presupposes that when the output shaft 160 is at rest, the shunt field windings 165 and 166 are equally energized; and that the units 163—164 are running at equal speeds; and that the spiders 146—150 and gears 157—158 are of equal diameter; and that the two differential gearings 144—145 are identical as to gear ratios and diameters; that is to say that the two parts of the system associated respectively with the differential gearings 144—145 are identical and that the transmission as a whole is symmetrical. It is believed to be apparent that the same end result will be obtained with two differential gearings and generator systems which are not identical or symmetrical as the result of differences in the gear diameters and differences in the generators.

It is believed therefore that the fundamental principle of the invention is more generally expressed by saying that certain elements and functions are "balanced" when the output shaft 160 is at rest, than by saying that they are equal, and this includes "balanced" energization of the shunt windings 165—166, "balanced" potentials and speeds of the generators, and "balanced" speeds and torques of the shafts 161—162, and "balanced" torques on the shaft 160 when at rest; and that it is more generally true to say that the "balanced" torque on the output shaft, when it is at rest, which results from two opposing torques, (or, as in the case of an overhauling type of load and the generator-motor, feed-back principle, results from these torques) eliminates back-lash lost motion by the fact that when the output shaft moves from rest it moves because of a change of the magnitude of the movement effecting torque without change of its direction, whether the movement be from, or to, or through zero speed.

As to the movement of the rheostat arm 173, this may be effected by various means to accomplish various load driving purposes and characteristics, several of which means have been shown in Fig. 7 and either of which may be used optionally.

The rheostat arm 173 is connected to a shaft 174 upon which is mounted a worm gear 175 meshed with a worm 176 on a shaft 177 to which is connected a hand wheel 178 for rotating the shaft.

A bevel gear 179 connected to the shaft 177 meshes with a bevel gear 180 on a shaft 181 connected to the spider element 182 of a differential gearing shown generally at 183. The spider 182 rotatably supports pinions 184 meshed with differential gears 185—186. The differential gear 186 is connected by a shaft 187 to a gear 188 driven upon rotation of the output shaft 160, and preferably through an idler gear 189 between the gear 158 and the gear 188. The differential gear 175 is connected to a bevel gear 190 meshing with a bevel gear 191 on a shaft 192 to which is connected a hand wheel 193 for turning the shaft.

The shaft 192 extends beyond the hand wheel 193 and has a clutch element 194 splined for axial movement thereon, effected by rocking movement of a lever 195. A corresponding clutch element 196 is connected to the shaft 197 of a motor driven unit 198. The unit 198 may be any one of the known or commercial units comprising a variable speed transmission, an output shaft 197, and a motor 199 for driving the output shaft through the transmission, and the transmission being provided with adjustable means for varying and setting the speed of the output shaft 197, and for maintaining it constantly at any set speed, in either the forward or reverse direction. The transmission 198 illustrated is provided with a hand wheel 200 for adjusting the speed of the output shaft 198, and a dial and scale 201 for indicating direction and speed at which it is set, and the motor 199 for driving it.

Assuming that the driven load connected to the output shaft 160 is one whose speed and direction is to be controlled by hand, the clutch 194—196 is first disconnected by operating the lever 195. The hand wheel 178 is then turned, turning the shaft 177, and this as will be apparent, acting through the worm 176 and worm gear 175, will move the arm 173 over the resistor 171 in one direction or the other from its intermediate point, to cause the output shaft 160 to rotate in one direction or the other, and at a speed proportional to the extent of movement of the arm 173. To stop the output shaft from rotating the arm 173 may be rotated back to its intermediate point by the hand wheel 178.

For any position of the arm 173, the output shaft will tend to rotate at a corresponding speed.

To bring the load to rest the hand wheel 178 is turned to move the arm 173, to its intermediate position of balance. The load can thus be driven in the forward direction or the reverse direction at different speeds, or brought to rest by the hand wheel 178. For overhauling loads the arm 173 would be stopped at one side of its middle position, as will be understood.

During this control, and referring to the differential gearing 183, the differential gear 186 will be rotated, and rotate the differential gear 185 and the gear 191 and the hand wheel 193, idly; but the shaft 181 will not be driven, thereby. The shaft 181 will be rotated idly by the hand wheel 178.

Again, if the load on the output shaft 160 is one which it is desired to drive accurately at a constant preselected speed, then the clutch 194—196 would be engaged by the lever 195, and the hand wheel 200 would be turned to set the transmission 198 to drive its output shaft 197 at a set constant speed.

It may be assumed here for simplicity, that the output shaft 160 is at rest, and that the rheostat arm 173 is in its said intermediate position of balance. The transmission 198 now rotates the shaft 192, gears 191—190 and the differential gear 185. The differential gear 186 is at rest and the gear 185 turns the spider 182, and the shaft 181, and the gears 180—179, and the shaft 177, thereby moving the rheostat arm 173 over the resistor, causing the output shaft 160 to rotate, at increasing speed. This rotational movement of the shaft 160, acting through the idler 189 and the gear 188 and shaft 187, turns the differential gear 186 in the direction opposite to the direction of the differential gear 185, and the increasing speed of the gear 186 brings it up to a speed at which it equals that of the gear 185; and thereupon the spider 182 stops rotating and stops movement of the arm 173, and the output shaft 160 thereafter rotates at the speed which it has by this time attained. If the output shaft 160 should, because of an increase of load thereon, tend to slow down, it will slow down rotation of the differential gear 186; and the gear 185, rotating at its constant speed will rotate the spider 182 and cause the arm 173 to be moved on the resistor to bring the speed of the output shaft back again to its preselected speed. Any tendency of the output shaft to increase in speed, is correspondingly corrected by movement of the rheostat arm 173 in the other direction by a similar response of the differential gearing 183.

The speed of rotation of the output shaft can at any time be set to a different constant speed by operation of the hand wheel 200 of the transmission 198.

During this regulation the hand wheel 178 will rotate idly as will the hand wheel 193.

In this connection it should be observed that the motor driven transmission unit 198 may be of very small fractional horsepower, incapable of driving by itself the load of the output shaft 160, whereas the motor 155 and the output shaft 166 and the associated elements of the transmission may be of large size able to transmit great horsepower, the unit 198 being merely a speed reference unit having only enough power to operate the rheostat arm 173.

Again, in some cases, the output shaft 160 will be connected to a driven load which is to be moved to a desired position and left in that position. Illustrative of such uses is the aiming of guns by motor power. In such a case, the output shaft 160 is to be rotated, preferably at high speed for a number of revolutions and then automatically slowed down and stopped. To effect this control, the clutch 194—196 is disengaged and the hand wheel 193 is turned. This turns the gear 185, and the spider 182 and the shaft 181 and moves the rheostat arm 173 to cause the output shaft to rotate.

Rotation of the output shaft turns the gears 188 and 186 in the direction to tend to neutralize the effect of rotation of the gear 185. Thus, so to speak, the differential gear 186 tries to catch up with the gear 185. The faster the wheel 193 is turned the more will the speed of the gear 185 stay ahead of the gear 186 and keep the rheostat arm 173 moving farther and farther from its midposition. There is a speed of rotation for the wheel 193 at which the arm 173 will become stationary on the resistor 171, and cause the output shaft to have a corresponding speed. If the rotation of the hand wheel 193 is slowed down below that speed or is stopped altogether, then the speed of the gear 186 will catch up with and overcome the speed of the gear 185, and turn the shaft 181 in the other direction, to return the arm 173 back toward its position of balance, slowing down the output shaft 160, and when the arm reaches the position of balance the output shaft will stop rotating.

During this control the hand wheel 178 rotates idly.

In the case of control by the hand wheels 178 or 193, the load, whether it is an overhauling load (as when the shaft 160 drives a hoist cable drum) or whether it is one moving with great inertia, improved dynamic braking may be had by the transmission.

Movement of the rheostat arm 173 controls the direction of torque on the output shaft 160 independently of the speed or direction of the output shaft. To quickly brake or stop an overhauling load or a load of great inertia, the rheostat arm 173 may be moved to a position which reverses the direction of torque on the output or load shaft. This brakes the load and as it slows down and approaches rest, the rheostat arm may be returned toward its intermediate position and arrive there when the load comes to rest (if it be an inertia load) or stop short of that position so as to maintain a load holding torque (if if be an overhauling load). As much torque as desired may thus be applied to brake the load, from high speed all the way to zero speed; and in fact, if the braking torque thus developed is not removed by return movement of the arm 173 when the load is brought to rest, it will immediately reverse the load under full power and torque; and this latter action, which is sometimes wanted, corresponds to the action obtained with conventional motor controls and is known as "plugging" the motor.

No additional elements are required to provide such dynamic braking or "plugging" with the transmission above described.

The transmission may be controlled by the hand wheel 193 as above referred to, to effect the driving of loads in the forward or reverse direction at different speeds, or to bring it to rest, instead of by the hand wheel 178, and when so doing, an additional feature of control may be had to advantage. Upon turning the hand wheel 193, (assuming for the sake of simplicity that the load is at rest), the shaft 181 moves the arm 173 to start the output shaft 160 as described. This starts rotation of the differential gear 186. The hand wheel 193 may be turned at a sufficiently rapid speed so as to cause the arm 173 to be moved a corresponding distance along the resistor 171 before the differential gear 186 "catches up" with the differential gear 185, so that the output shaft may be caused to attain a desired speed. If not the hand wheel 193 be released, the rheostat arm 173 will stay in its moved position for that speed of the output shaft, and the rotating differential gear 186 will rotate the gear 185, and, through the gears 190—191, will cause the hand wheel 193 to continue to rotate idly. The output shaft therefore will continue to be driven at its desired speed. To bring the load to rest, the hand wheel 193 may be grasped and its rotation stopped. The rotating gear 186 will now rotate the spider 182 to restore the arm 173 in the other direction to its intermediate position at which the output shaft will come to rest. If, instead of merely stopping the hand wheel 193, it be rotated in the opposite direction, the arm 173 will be restored more rapidly to more rapidly stop the load, or if the hand wheel 193 be turned fast enough and far enough in the opposite direction, the arm 173 will move beyond its intermediate position and stop the load by the plugging action referred to above.

As mentioned before, any one of the several controls herein described and shown in Fig. 7 may be used alone; or any of them in combination with another; the reason for illustrating and describing all of them in connection with the embodiment of Fig. 7 being to simplify the drawing which otherwise would require numerous additional figures.

While the fields 165—166 are in Fig. 7 energized by the units 163—164 themselves, to always load these units for the advantages described, these fields may be energized from an independent source, for example as in Fig. 1.

When as in the form of Fig. 1, the speed of the output shaft 71 is varied in a speed range from zero to maximum, but always in the same direction, I have found that an increase in gearing transmission efficiency as well as other advantages, is effected, if the speed of the shaft 40 is maximum and the speed of the shaft 50 is at a corresponding minimum when the load shaft 71 is at rest; due to the fact that the maximum peripheral speeds of the tooth-engaged gears of the differential gearings 35—45 will then be the least for the whole range of load shaft speed; and this is effected by the disclosed arrangement of the gears of the respective gearings 35—45, whereby one is power-driven by its spider 36, and the other by its differential gear 49.

When, as in Fig. 7, the speed of the load shaft 160 is varied from zero to a maximum speed in each direction, I have found that the gearing transmission efficiency is greatest when the two differential gearings 144 and 145 have their respective groups of three gear elements homologously arranged; and when the power is put in at say the spider element 150 and taken out at say the differential gear 152 as described. This may be made clear as follows.

In Fig. 7, for a given speed of the input spider 150, and with the output gear 152 at rest, the speed control gear 153 has twice the speed of the iput spider 150. Upon slowing down the gear 153 (by the control and theoretically to zero) the speed of the output gear 152 goes up to double that of the input spider 150.

For the same gearing and same delivered speeds and same power input speed as in Fig. 7, if, hypothetically, the power were for example put in at the gear 153 and taken out at the spider 150, and the speed of the gear 152 were varied (by the control), then when the output spider 150 was at rest, the control gear 152 would rotate at the same speed as the input gear 153. When the speed of the gear 152 was reduced (by the control and theoretically to zero) the speed of the output spider 150 would rise to only one-half of the speed of the input gear 153.

With this hypothetical arrangement, therefore, to have the same output speed range for the output spider 150 as that of the output gear 152 of Fig. 7, the speed of the input gear 153 in this arrangement would have to be four times as great as that of the input spider 150 of Fig. 7.

Again, if, for example, and hypothetically, the power were put in at the gear 153 and taken out at the gear 152, and the speed of the spider 150 were varied (by the control), then when the gear 152 was at rest, the spider 150 would rotate at one-half the speed of the gear 153. When the speed of the spider 150 was reduced (by the control and theoretically to zero) the speed of the output gear 152 would rise only to the speed of the gear 153; and to have the same output speed range as for Fig. 7, the speed of the input gear 153 in this hypothetical arrangement would have to be twice that of the speed of the input spider 150 of Fig. 7.

The peripheral speeds of the gears at their gear tooth engagement, particularly that of the pinions 151—151 (which in practice are usually much smaller in diameter than the differential gears) would be excessive in either of these hypothetical cases, with resulting inefficiency.

The said pinions rotate due to relative speed between the differential gears and the spider. This relative speed, at its maximum in Fig. 7, is two to one. In the second hypothetical case above it is twice as great as that; and in the first hypothetical case is four times as great.

Subject matter illustrated and described herein but not claimed is being claimed in my copending application, Serial No. 96,372, filed May 31, 1949.

I claim:

1. In a power transmission for driving a power output load shaft at variable speed; a first and a second differential gearing, each comprising three elements, namely, a spider rotatably supporting a pinion and a pair of differential gears meshed with the pinion; one differential gear of each gearing connected to the load shaft and both driving it; the spider of the first gearing and the other differential gear of the second gearing adapted to be drivingly connected to a continuously running power supplying motor; an electric generator driven by the other differential gear of the first gearing; an electric motor receiving current from the generator and driven thereby and drivingly connected to the spider of the second gearing to drive it; the generator and motor having field windings; circuit means supplying current to the field windings; and current controlling means for varying relatively the current to the field windings, to concurrently increase the field strength of the generator and weaken that of the motor.

2. In a power transmission for driving a power output load shaft at variable speed; a first and a second differential gearing, each comprising three elements, namely, a spider rotatably supporting a pinion and a pair of differential gears meshed with the pinion; one differential gear of each gearing connected to the load shaft and both driving it; the spider of the first gearing and the other differential gear of the second gearing adapted to be drivingly connected to a continuously running power supplying motor; an electric generator driven by the other differential gear of the first gearing; an electric motor receiving current from the generator and driven thereby and drivingly connected to the spider of the second gearing to drive it; the generator and motor having field windings; circuit means supplying current to the field windings; and field current controlling means for increasing the field strength of the generator sufficiently to cause it to develop increased electrical load sufficiently to slow it down, and increase the speed of the motor by the increased generator current supplied thereto, and to concurrently weaken the strength of the motor field sufficiently to further increase its speed to thereby cause the said one differential gear of both gearings to increase in speed and increase the speed of the load shaft.

3. In a power transmission for driving a power output load shaft at variable speed; a first and a second differential gearing, each comprising three elements, namely, a spider rotatably supporting a pinion and a pair of differential gears meshed with the pinion; one differential gear of each gearing connected to the load shaft and both driving it; the spider of the first gearing and the other differential gear of the second gearing adapted to be drivingly connected to a continuously running power supplying motor; an electric generator driven by the other differential gear of the first gearing; an electric motor receiving current from the generator and driven thereby and connected to the spider of the second gearing to drive it; the generator and motor having field windings; circuit means supplying current to the field windings; and current controlling means for varying relatively the current to the field windings, to concurrently increase the field strength of the generator and weaken that of the motor; to develop increased electrical load on the generator and thereby to slow it down, and to increase the speed of the motor, by the increased generator current supplied thereto and by its weakened field, to cause the said one differential gear of both gearings to increase in speed and increase the speed of the load shaft; the fields having relative strengths at which the said one differential gear of both gearings are at rest and the load shaft is at rest.

4. In a power transmission for driving a power output load shaft at variable speed; a first and a second differential gearing, each comprising three elements, namely, a spider rotatably supporting a pinion and a pair of differential gears meshed with the pinion; one differential gear of each gearing connected to the load shaft and both driving it; one of the other two elements of each gearing adapted to be drivingly connected to a continuously running power supplying motor; an electric generator driven by the third element of one gearing; an electric motor; the generator and motor having energizable fields; a circuit supplying current developed by the generator to the motor and driving it; the motor connected to the third element of the other gearing and driving it; a field energizing circuit and control means to relatively vary the respective field strengths; the fields having relative strengths at which the electrical load developed by the generator slows it down, and the electric load supplied by the generator to the motor speeds it up, and the said one differential gear of the respective gearings drive the load shaft; and the fields having other relative strengths at which the generator speeds up to a maximum speed and the motor slows down to a minimum speed slower than the maximum speed of the generator at which speeds the load shaft is at rest.

5. In a power transmission for driving a power output load shaft at variable speed; a first and a second differential gearing, each comprising three elements, namely, a spider rotatably supporting a pinion and a pair of differential gears meshed with the pinion; one differential gear of each gearing connected to the load shaft and both driving it; one of the other two elements of each gearing adapted to be drivingly connected to a continuously running power supplying motor; an electric generator driven by the third element of one gearing; an electric motor; the generator and motor having energizable fields; a circuit supplying current developed by the generator to the motor and driving it; the motor connected to the third element of the other gearing and driving it; a field energizing circuit and control means to relatively vary the respective field strengths; the fields having relative strengths at which the electrical load developed by the generator slows it down, and the electric load supplied by the generator to the motor speeds it up, and the said one differential gear of the respective gearings drive the load shaft; and having other relative strengths at which the counter voltage of the motor balances the generator voltage, and the motor is driven by the third gearing element to which it is connected, and the said one differential gear of the respective gearings are at rest and the load shaft is at rest; and the generator has a maximum speed and the motor a minimum speed less than the generator maximum speed.

6. In a power transmission for driving a power output load shaft at variable speed; a first and a second differential gearing each comprising three elements, namely, a spider rotatably supporting a pinion, and two differential gears meshed with the pinion; one element of each gearing adapted to be drivingly connected to a continuously running power supplying motor, a second element of each gearing drivingly connected to the load shaft; a generator driven by the third element of the first gearing; a motor drivingly connected to the third element of the second gearing; the motor electrically connected to the generator and being driven by its current load; the motor and generator having variably energizable fields; an energizing circuit for the fields and rotary circuit control means for varying the strengths of the fields to selectively increase one and decrease the other and vice versa; to cause the generator to slow down and the motor to speed up and vice versa and thereby cause the load shaft to be driven at different selected speeds; a first and a second control differential gearing each comprising three elements namely a spider rotatably supporting a pinion and two differential gears meshed with the pinion; means driving one element of the first control gearing at a speed proportional to the load shaft speed; and a second element drivingly connected to the rotary circuit control means; and its third element drivingly connected to an element of the second control gearing; a variable speed ratio transmission comprising a rotary driving input element and a rotary driven output element and operable adjusting means for varying the speed ratio therebetween; a constant speed motor driving the input element; the other two elements of the second control gearing drivingly connected respectively to the input and output elements.

7. In a power transmission for driving a power output load shaft at variable speed; a first and a second differential gearing each comprising three elements, namely, a spider rotatably supporting a pinion, and two differential gears meshed with the pinion; a spider of the first gearing and a differential gear of the second gearing, adapted to be drivingly connected to a continuously running power supplying motor, a differential gear of each gearing drivingly connected to the load shaft; a generator driven by the other differential gear of the first gearing; a motor drivingly connected to the spider of the second gearing; the motor being driven by current load of the generator; the motor and generator having variably energizable fields; an energizing circuit for the fields and circuit control means for varying the strengths of the fields to increase one and decrease the other and vice versa; to cause the generator to slow down and the motor to speed up and vice versa to thereby cause the load shaft to be driven at a corresponding speed; and the fields having relative strengths at which the generator is driven at maximum speed and the motor at minimum speed less than the generator maximum speed and at which speeds the load shaft is at rest.

8. In a power transmission for driving a power output load shaft at variable speed; a first and a second differential gearing each comprising three elements, namely, a spider rotatably supporting a pinion, and two differential gears meshed with the pinion; one element of each gearing adapted to be drivingly connected to a continuously running power supplying motor, a second element of each gearing drivingly connected to the load shaft; a generator driven by the third element of the first gearing; a motor drivingly connected to the third element of the second gearing; the motor electrically connected to the generator and being driven by its current load; the motor and generator having variably energizable fields; an energizing circuit for the fields and rotary circuit control means for varying the strengths of the fields to selectively increase one and decrease the other and vice versa; to cause the generator to slow down and the motor to speed up and vice versa and thereby cause the load shaft to be driven at different selected speeds; a first and a second control differential gearing each comprising three elements namely a spider rotatably supporting a pinion and two differential gears meshed with the pinion; means driving one element of the first control gearing at a speed proportional to the load shaft speed; and a second element drivingly connected to the rotary circuit control means; and its third element drivingly connected to an element of the second control gearing; a variable speed ratio transmission comprising a rotary driving input element and a rotary driven output element and operable adjusting means for varying the speed ratio therebetween; a constant speed motor driving the input element; the other two elements of the second control gearing drivingly connected respectively to the input and output elements; the variable speed ratio transmission having a speed-ratio at which the connected elements of the first and second control gearings remain at rest, and other different ratios at which said connected elements rotate at respectively different speeds.

9. In a power transmission for driving a power output load shaft at variable speed; a first and a second differential gearing each comprising three elements, namely, a spider rotatably supporting a pinion, and two differential gears meshed with the pinion; one element of each gearing adapted to be drivingly connected to a continuously running power supplying motor, a second element of each gearing drivingly connected to the load shaft; a generator driven by the third element of the first gearing; a motor drivingly connected to the third element of the second gearing; the motor electrically connected to the generator and being driven by its current load; the motor and generator having variably energizable fields; an energizing circuit for the fields and rotary circuit control means for varying the strengths of the fields to selectively increase one and decrease the other and vice versa; to cause the generator to slow down and the motor to speed up and vice versa and thereby cause the load shaft to be driven at different selected speeds; a first and a second control differential gearing each comprising three elements namely a spider rotatably supporting a pinion and two differential gears meshed with the pinion; means driving one element of the first control gearing at a speed proportional to the load shaft speed; and a second element drivingly connected to the rotary circuit control means; and its third element drivingly connected to an element of the second control gearing; a variable speed ratio transmission comprising a rotary driving input element and a rotary driven output element and operable adjusting means for varying the speed ratio therebetween; a constant speed motor driving the input element; the other two elements of the second control gearing drivingly connected respectively to the input and output elements; and operable means to start and stop the constant speed motor at any speed ratio adjustment.

10. In a power transmission for driving a power output load shaft at variable speed; a first and a second differential gearing each comprising three elements, namely, a spider rotatably supporting a pinion, and two differential gears meshed with the pinion; one element of each gearing adapted to be drivingly connected to a continuously running power supplying motor, a second element of each gearing drivingly connected to the load shaft; a generator driven by the third element of the first gearing; a motor drivingly connected to the third element of the second gearing; the motor electrically connected to the generator and being driven by its current load; the motor and generator having variably energizable fields; an energizing circuit for the fields and rotary circuit control means for varying the strengths of the fields to selectively increase one and decrease the other and vice versa; to cause the generator to slow down and the motor to speed up and vice versa and thereby cause the load shaft to be driven at different selected speeds; a first and a second control differential gearing each comprising three elements namely a spider rotatably supporting a pinion and two differential gears meshed with the pinion; means driving one element of the first control gearing at a speed proportional to the load shaft speed; and a second element drivingly connected to the rotary circuit control means; and its third element drivingly connected to an element of the second control gearing; a variable speed ratio transmission comprising a rotary driving input element and a rotary driven output element and operable adjusting means for varying the speed ratio therebetween; a constant speed motor driving the input element; the other two elements of the second control gearing drivingly connected respectively to the input and output elements; the variable speed ratio transmission having a speed-ratio at which the connected elements of the first and second control gearings remain at rest, and other different ratios at which said connected elements rotate at respectively different speeds; and a tachometer instrument energizing generator driven at speeds proportional to the speeds of the said output element at different speed ratio adjustments.

11. In a power transmission for driving a power output load shaft at variable speed; a first and a second differential gearing each comprising three elements, namely, a spider rotatably supporting a pinion, and two differential gears meshed with the pinion; one element of each gearing adapted to be drivingly connected to a continuously running power supplying motor, a second element of each gearing drivingly connected to the load shaft; a generator driven by the third element of the first gearing; a motor drivingly connected to the third element of the second gearing; the motor electrically connected to the generator and being driven by its current load; the motor and generator having variably energizable fields; an energizing circuit for the fields and rotary circuit control means for varying the strengths of the fields to selectively increase one and decrease the other and vice versa; to cause the generator to slow down and the motor to speed up and vice versa and thereby cause the load shaft to be driven at different selected speeds; a first and a second control differential gearing each comprising three elements namely a spider rotatably supporting a pinion and two differential gears meshed with the pinion; means driving one element of the first control gearing at a speed proportional to the load shaft speed; and a second element drivingly connected to the rotary circuit control means; the second control gearing having one differential gear drivingly connected to the third gear element of the first control gearing; a variable speed ratio transmission comprising a rotary driving input element and a rotary driven output element and operable adjusting means for varying the speed ratio therebetween; a constant speed motor driving the input element; the second control gearing having its other differential gear drivingly connected to the input element, and having its spider driven by the output element and in the same direction and at a one-to-one speed ratio; the variable speed ratio transmission when at a one-to-two ratio between the input and output elements, causing the connected differential gears of the two control gearings to remain at rest, and at more nearly equal ratios causing them to rotate.

12. In a power transmission for driving a power output load shaft at variable speed; a transmission mechanism comprising a pair of differential gearings each gearing comprising three elements, namely: a spider rotatively supporting a pinion and two differential gears meshed with the pinion; one element of each gearing drivingly connected to the load shaft; another element of each gearing adapted to be drivingly connected to a continuously running power supplying motor; the third elements of the gearings drivingly connected respectively to an electric generator and an electric motor, having respective field windings; the motor electrically connected to the generator to be electrically driven thereby; an electric circuit for energizing the field windings, and rotary circuit control means controlling the current in the windings to vary the field strengths relatively; to cause the generator to slow and the motor to speed up and vice versa, and thereby cause the load shaft to be driven at corresponding speeds; a three element control differential gearing; means to drive a first element of the control gearing at speed commensurable with the speed of the load shaft, and a second element of the control gearing connected to the rotary control means to drive it; a constant speed control motor; a variable-speed-ratio transmission device between the control motor and the third element of the control differential gearing, and thereby rendered effective to hold the rotary control means at rest at a predetermined speed ratio of the device and to cause it to rotate at other speed ratios; and operable means to change the speed ratio of the variable-speed-ratio device.

13. In a power transmission for driving a power output load shaft at variable speed; a transmission mechanism comprising a pair of differential gearings each gearing comprising three elements, namely: a spider rotatively supporting a pinion and two differential gears meshed with the pinion; one differential gear of each gearing connected to the load shaft; the spiders of both gearings adapted to be connected to a continuously running power supplying motor to be driven thereby; an electric generator and an electric motor connected respectively to the other differential gears of the gearings; the motor electrically connected to the generator to receive current therefrom and be electrically driven thereby; the motor and generator having respective field windings; circuit means supplying current to the field windings; and circuit controlling means for varying relatively the current to the field windings to concurrently relatively strengthen one and weaken the other.

14. In a power transmission for driving a power output load shaft at variable speed; a transmission mechanism comprising a pair of differential gearings each gearing comprising three elements, namely: a spider rotatively supporting a pinion and two differential gears meshed with the pinion; one differential gear of said gearing drivingly connected to the load shaft; the spiders of both gearings adapted to be connected to a continuously running power supplying motor to be driven thereby; an electric generator and an electric motor connected respectively to the other differential gears of the gearings; the motor electrically connected to the generator to receive current therefrom and be electrically driven thereby; the motor and generator having respective field windings; circuit means supplying current to the field windings; and rotary circuit controlling means for varying relatively the current to the field windings to concurrently relatively strengthen one and weaken the other; to cause the generator to slow down and the motor to speed up and vice versa to thereby cause the load shaft to be driven at corresponding speeds; a three element control differential gearing; means driving one element of the control gearing at speed proportional to that of the load shaft; another element of the control gearing being connected to the rotary circuit controlling means; a variable speed ratio transmission device having a rotary input and a rotary output element; the output element connected to the third element of the control differential gearing; a constant speed motor driving the input element of the device; and operable means to change the speed ratio of the device.

15. In a power transmission for driving a power output load shaft at variable speed; a transmission mechanism comprising a pair of differential gearings each gearing comprising three elements, namely: a spider rotatively supporting a pinion and two differential gears meshed with the pinion; one differential gear of each gearing drivingly connected to the load shaft; the spiders of both gearings adapted to be connected to a continuously running power supplying motor to be driven thereby; an electric generator and an electric motor connected respectively to the other differential gears of the gearings; the motor electrically connected to the generator to receive current therefrom and be electrically driven thereby; the motor and generator having respective field windings; circuit means supplying current to the field windings; and rotary circuit controlling means for varying relatively the current to the field windings to concurrently relatively strengthen one and weaken the other; to cause the generator to slow down and the motor to speed up and vice versa to thereby cause the load shaft to be driven at corresponding speeds; a three element control differential gearing; means driving one element of the control gearing at speed proportional to that of the load shaft; another element of the control gearing being connected to the rotary circuit controlling means; a variable speed ratio transmission device having a rotary input and a rotary output element; the output element connected to the third element of the control differential gearing; a constant speed motor driving the input element of the device; and operable means to change the speed ratio of the device; a disconnecting clutch between the third element of the control differential gearing and the device; a handle for rotating the third element of the control gearing; and a handle for rotating the rotary current control means.

16. In a power transmission for driving a power output load shaft at variable speed; a transmission mechanism comprising a pair of differential gearings each gearing comprising three elements, namely: a spider rotatively supporting a pinion and two differential gears meshed with the pinion; one element of each gearing connected to the load shaft; another element of each gearing adapted to be drivingly connected to a continuously running power supplying motor; the third elements of the gearings connected respectively to an electric generator and an electric motor, having respective field windings; the motor electrically connected to the generator to be electrically driven thereby; an electric circuit for energizing the field windings, and rotary circuit control means controlling the current in the windings to vary the field strengths relatively; to thereby cause the generator to slow down and the motor to speed up and vice versa to cause the load shaft to be driven at a corresponding speed; a control differential gearing; means driving a first element of the control gearing at speed commensurable with the speed of the load shaft and a second element of the control gearing being connected to the rotary control means to drive it; a constant speed control motor; a variable-speed-ratio transmission device between the control motor and the third element of the control differential gearing, and thereby rendered effective to hold the rotary control means at rest at a predetermined speed ratio of the device and to cause it to rotate at other speed ratios; and operable means to change the speed ratio of the variable-speed-ratio device.

17. In a power transmission for driving a power output load shaft; a continuously running power supplying motor; differential transmission gearing between the motor and the load shaft; a transmission controller comprising a continuously rotatable element and means responsive to change of speed of the rotatable element to initiate a gradual change of the relative speeds of the differential gears and a gradual change of the speed of the output shaft to an ultimate attained speed; a source of power and a variable speed-ratio transmission device for rotating the rotatable element at different speeds; operable means to adjustably change the speed ratio of the device to change the speed of the rotatable element and thereby preset the speed which the output shaft will attain; and a tachometer driven at a speed proportional to that of the rotatable element and indicating the preset speed which the output shaft will attain.

LEV A. TROFIMOV.

REFERENCES CITED

The following references are of record in the file of this patent:

UNITED STATES PATENTS

| Number | Name | Date |
| --- | --- | --- |
| 2,348,211 | Frische et al. | May 9, 1944 |
| 2,384,776 | Trofimov | Sept. 11, 1945 |
| 2,429,570 | Trofimov | Oct. 21, 1947 |